INVENTOR.
DANIEL P. HEARN
BY
Robert K. Schumacker
ATTORNEY

June 21, 1960 D. P. HEARN 2,942,112
MULTIPLE WELL LOGGING SYSTEM
Filed Dec. 28, 1956 4 Sheets-Sheet 4
LINE A
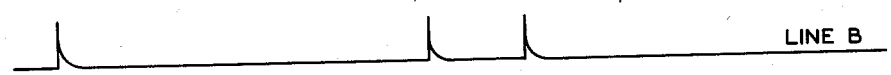
LINE B
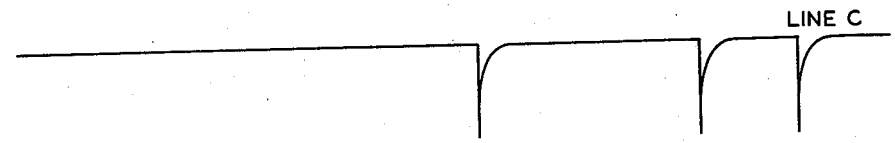
LINE C
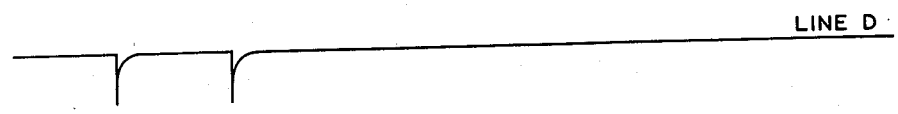
LINE D
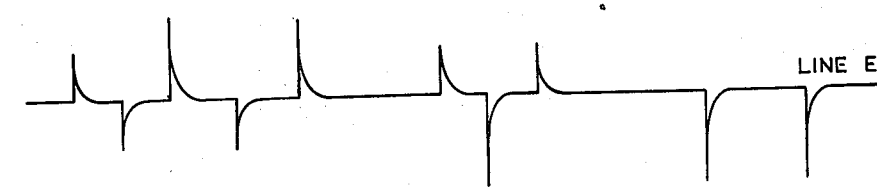
LINE E
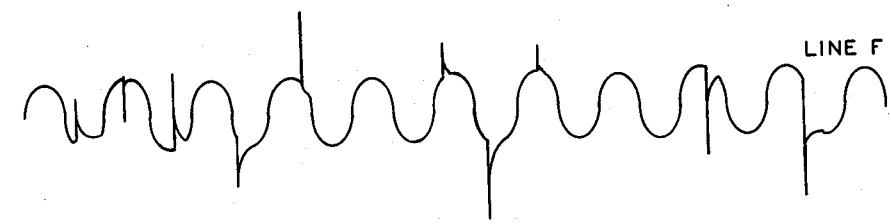
LINE F
FIG. 4
INVENTOR.
DANIEL P. HEARN
BY
Robert F. Schumacher
ATTORNEY 2,942,112
MULTIPLE WELL LOGGING SYSTEM Daniel P. Hearn, Tulsa, Okla., assignor to Well Surveys, Incorporated, a corporation of Delaware Filed Dec. 28, 1956, Ser. No. 631,192

7 Claims. (Cl. 250—83.3)

This invention relates to telemetering systems and especially to telemetering systems for simultaneously transmitting a plurality of information-carrying signals over a single conductor.

In the art of radioactivity well logging, it is desired to obtain geological or geophysical data concerning the subsurface rock formations surrounding a borehole which may extend many thousands of feet below the surface of the earth. These boreholes are only a few inches in diameter. Consequently, it is impossible to visually examine the formations in situ. However, it has been found that considerable information concerning the formations may be obtained by measuring gamma rays emitted by the formations naturally or by irradiating the formations with gamma rays or neutrons and measuring the induced and scattered radiations returning to the borehole. To accomplish this, an instrument containing the source and detector is suspended on a cable and lowered into the borehole. Signals from the detector are then transmitted through the cable to the surface of the earth where they may be recorded.

Gamma rays and neutrons each provide different informations. Moreover, additional information can be obtained by measuring either of these radiations at a plurality of energy levels. Consequently, it is often desirable to transmit several signals to the surface simultaneously. Heretofore, this has been attempted in a number of ways. However, none of them have been entirely satisfactory. It has been suggested that multiconductor cable be employed having a separate conductor for each signal channel. Unfortunately such cables are extremely expensive and the size of the cable becomes unwieldly where any useful number of signals is called for.

On the other hand, various schemes have been devised for simultaneously transmitting two or three signals over a single conductor. However, these suggestions have also had disadvantages. Many of the prior art systems have called for the use of batteries in the subsurface instrument. This is unsatisfactory since temperatures as high as 300 to 400 degrees Fahrenheit are frequently encountered in boreholes, and batteries fail rapidly and often actually explode at such heat. Other systems have called for supplying alternating current down the cable for power and transmitting the signals up the cable by slowly varying direct current. This is highly unsatisfactory, however, as only one direct current signal can be transmitted over a cable at a time. Consequently, the number of available signal channels is greatly restricted. Moreover, transmission systems using either low frequency A.C. or slowly varying D.C. are subject to interference from ground currents flowing in the logging cable. Furthermore, troubles are frequently experienced with magnetization of the cable and down which gives rise to spurious signals in the same spectrum as the transmitted signal. Additional troubles are experienced due to magnetized well casing, and power line ground return currents. The amplification of this type signal requires D.C. amplifiers with their usual drift and instability. Furthermore, the signal noise ratio of such a system is decidedly inferior to that of the proposed system. In addition, such systems require the use of automatic gain control circuits to regulate the pulses. This greatly increases the complexity of the sub-surface instrument, and reduces the reliability of the device.

The disadvantages of prior art telemetering systems are overcome with the present invention, and a novel system is disclosed wherein substantially any number of separate information carrying signals may be transmitted over a single conductor simultaneously without interfering with each other. Consequently, single conductor cables may be employed for transmitting a plurality of signals and, where multi-conductor cables are used, the number of available channels is greatly increased.

The advantages of the present invention are preferably attained by providing novel means for superimposing positive and negative signal pulses on a modulated carrier wave. The combined wave is then transmitted through a conductor and is subsequently separated into the various signals which may be put to use in any desired manner.

It is an object of the present invention to provide a novel telemetering system which permits the simultaneous transmission of a plurality of information-carrying signals over a single conductor without interference between the vairous signals.

Another object of the present invention is to provide a novel telemetering system which vastly increases the number of channels available in a multi-conductor cable.

A specific object of the invention is to provide a novel telemetering system which superimposes positive and negative pulses on a modulated carrier wave, transmits the combined wave over a conductor and subsequently separates the combined wave into the various signals.

Numerous other objects and features of the present invention will be apparent from the following description wherein reference is made to the figures of the accompanying drawings.

In the drawings:

Fig. 4 is a diagram illustrating the wave forms of the pulses from the signal circuits of Fig. 3.

Figure 1:
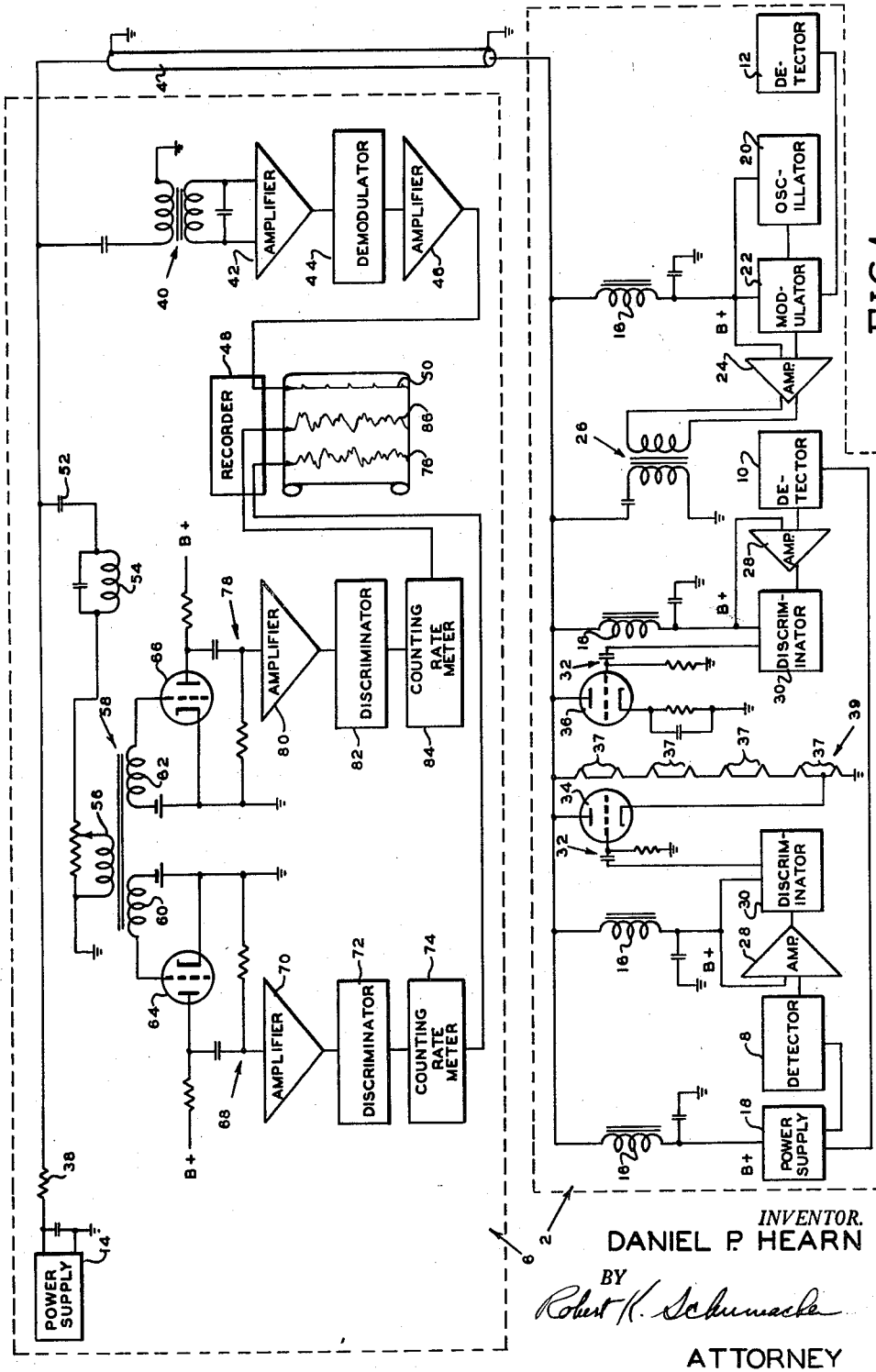
Fig. 1 is a schematic drawing of a typical telemetering system embodying the present invention.

In those forms of the invention chosen for purposes of illustration in the drawings, Fig. 1 shows a typical telemetering system embodying the present invention which may, for example, be used in radioactivity logging of oil wells and the like where it is desired to obtain separate signals carrying information relating to gamma ray flux, neutron flux and the location of collars or joints in the well casing. In such cases, a subsurface detector instrument or signal transmitter unit is lowered into the well on the end of a cable and the various signals are transmitted up the cable to the surface of the earth where they are fed to a recording device which plots a log showing the information obtained.

In Fig. 1, the subsurface detector instrument is designated generally by the dotted line enclosure indicated at 2. The subsurface instrument 2 is suspended in the well by cable 4 which also serves to carry signals from the instrument 2 to the surface equipment or signal separating unit indicated generally at 6.

Within the subsurface instrument 2 are housed three signal generators, such as a gamma ray detector 8, a neutron detector 10, and a casing collar detector 12. The gamma ray and neutron detectors 8 and 10 may be Geiger counters, proportional counters, scintillation detectors or any other type of signal source which yields a pulse type signal. The casing collar detector 12 is preferably an electrical or magnetic type signal generator whose output may be caused to modulate the amplitude or frequency of a carrier wave such as a sine wave.

To provide electrical power for operating the various components of the subsurface instrument 2, a source of energy, such as power supply 14, may be provided in the surface equipment 6 and may be connected to the cable 4 to pass current down the cable 4 to the subsurface instrument 2 to energize the various signal circuits. The power supply 14 may generate direct current or alternating current of a low frequency sufficiently different from the signal frequencies so as to preclude interference. Preferably, decoupling filters 16 are provided in the power inputs of the signal circuits to isolate the signal circuits from the energizing current on the cable 4. Where higher voltage is required for some of the elements of the subsurface instrument 2, such as Geiger counters or the like, a high voltage power supply 18 may be provided in the subsurface instrument 2 to supplement the surface power supply 14 by converting the direct current to alternating current and amplifying it as desired.

In order to transmit information from the subsurface instrument 2 to the surface equipment 6, an oscillation 20 is provided which puts out a continuous alternating current signal at a frequency which is sufficiently high to avoid any likelihood of confusion with the current which is being fed down the cable by the surface power supply 14. It has been found in practice that an oscillator which generates a sine wave at a frequency of approximately 2000 cycles per second is quite satisfactory when the power supply 14 is feeding direct current down the cable 4.

One of the information-carrying signals, for example, that from casing collar detector 12, may be applied to the carrier wave by passing the carrier wave from the oscillator 20 to a modulator 22 which also receives the signal output from detector 12 and modulates the carrier wave accordingly. The modulator may be of any conventional or desired type and may vary either the amplitude or the frequency of the carrier wave. Thereafter, the modulated carrier wave is amplified by amplifier 24 and is impressed on the cable by means of an impedance matching transformer 26.

Figure 2:
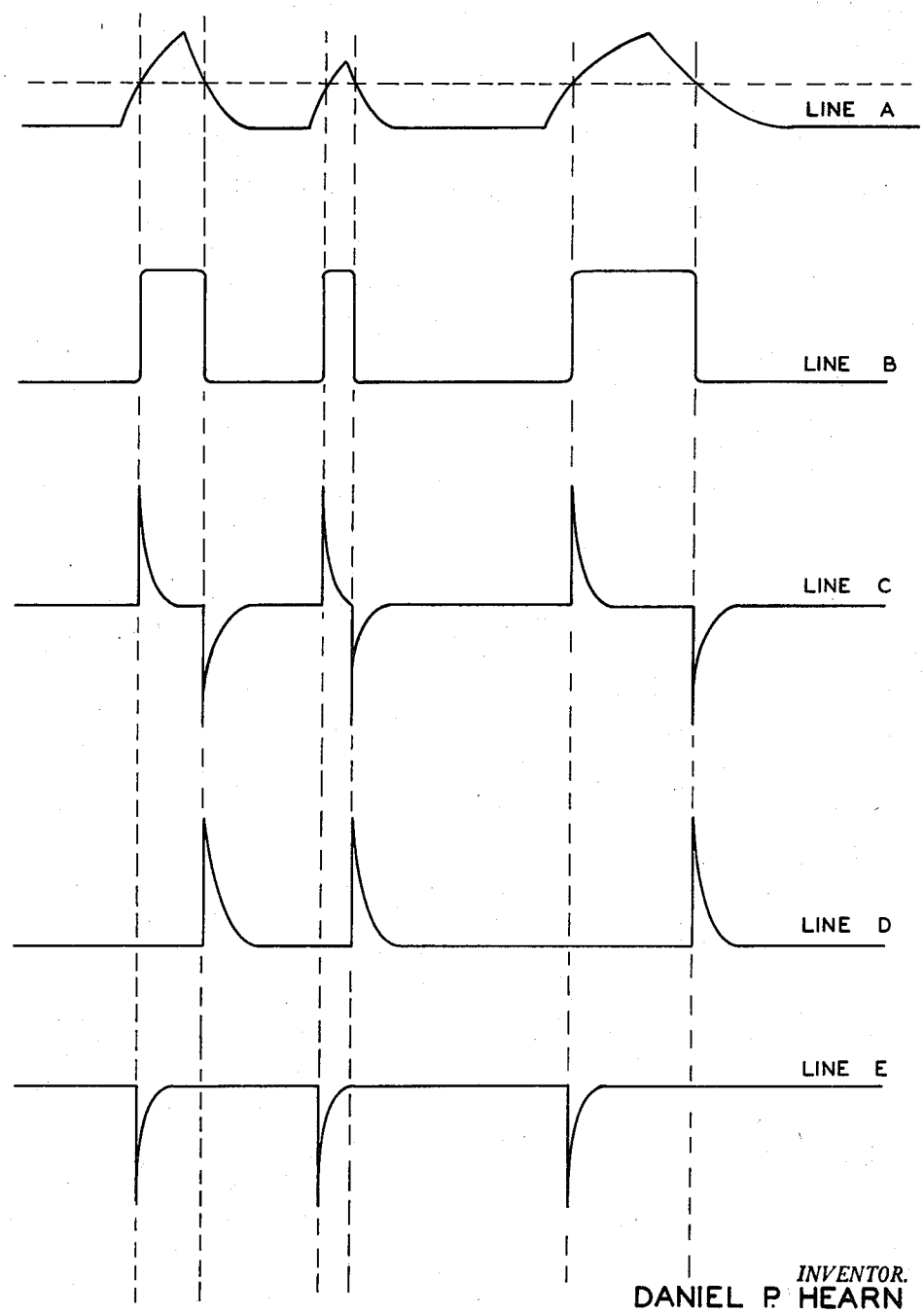
Fig. 2 is a diagram illustrating the wave forms of the pulses from the signal circuits of Fig. 1.

The detectors 8 and 10 give out pulse type signals which vary according to changes in the quantities they are measuring. The signals from these detectors are passed through amplifiers 28 and are then fed to discriminators 30 which give out pulses of constant height but having a width corresponding to the width of the detector pulses at the discriminating level. This operation is illustrated in Fig. 2 where line A shows the pulses generated by the detectors, and line B shows the same pulses after the discriminating operation. The information carried by signals of this type is found in the time rate of occurrence of succeeding pulses. The discriminators 30 may be of any suitable type, such as a univibrator or a Schmitt trigger circuit, and may include a combination of a discriminator and a scaling circuit, or merely a scaling circuit alone used as a discriminator.

From the discriminators 30, the signals are supplied to differentiating circuits 32 which change the more or less rectangular pulses of the discriminator output into positive and negative pulses having a sharp rise and an exponential decay. This operation is illustrated in line C of Fig. 2 which shows the pulses after the differentiating operation has been performed.

After being amplified and passed through the discriminators and differentiating circuits, the signals from detectors 8 and 10 are applied to the control grids of electron tubes 34 and 36 respectively. Tube 34, which receives the signal corresponding to that from detector 8, has its plate connected to the cable 4 and its cathode connected to ground through suitable means 37 biasing the tube 34 at cut-off so as to normally draw little or no plate current. Consequently, the tube is insensitive to the negative portion of the pulses shown in line C of Fig. 2. On the other hand, the positive portion of the pulses causes the tube to conduct thereby shunting a portion of the charge on the cable 4 to ground. A load resistor 38 is included in the surface equipment 6 between the cable 4 and the power supply 14 and, when the charge on the cable 4 is shunted to ground, a negative pulse, as seen in line E of Fig. 2, is created across the load resistor 38 and is superimposed on the modulated carrier wave.

The load resistor 38 is preferably chosen relatively small, on the order of 25 to 100 ohms, to minimize the time required for the capacitance of the cable 4 to regain its original charge after each pulse. A typical cable capacitance is about one to two microfarads and the time constant for recovery of its charge approximates the product of the cable capacitance times the value of the load resistor 38. Thus, the cable pulse width may be restricted to a usable value by limiting the value of the load resistor 38.

Tube 36, which receives the signal corresponding to that from detector 10, is connected similarly to tube 34 except that tube 36 is biased by suitable means to draw heavy plate current. Thus, tube 36 is sensitive only to the negative portion of the signal from its associated differentiating circuit. In this instance, when the tube is driven with a negative pulse, it applies a positive pulse to the cable 4, as seen in line D of Fig. 2 which is also superimposed on the carrier wave in the same manner as described above for tube 34.

From the foregoing description, it will be apparent that signals from detector 12 serve to modulate the carrier wave while signals from detectors 8 and 10 appear respectively as negative and positive pulses superimposed on the carrier wave. These signals travel up the cable 4 as a combined wave and are separated again by the surface equipment 6 into the independent signals.

In order to conserve power and provide a low impedance voltage divider for biasing tubes 34 and 36, it has been found extremely convenient to connect the filaments 37 of the various vacuum tubes in the subsurface instrument 2 in series between the cable 4 and ground, as indicated at 39 in Fig. 1. Each filament 37 thus constitutes a 6 volt increment and the bias for tubes 34 and 36 may be chosen by tapping between appropriate filaments.

When the combined signal from the subsurface instrument 2 reaches the surface, it is passed through a transformer 40 which is tuned to accept the modulated carrier wave and to reject the pulse frequencies. Thus, the signal of detector 12 is separated from the pulse type signals of detectors 8 and 10. The carrier is then sent through amplifier 42 to a suitable demodulator 44 which removes the signal of detector 12 from the carrier wave. The detector signal may then be passed through amplifier 46 to the recorder 48 where its information is plotted on curve 50.

That portion of the combined signal which is rejected by transformer 40 is passed through a pulse coupling capacitor 52 to a simple parallel resonant rejection trap 54 which is tuned to pass the pulse signals from detectors 8 and 10 and to reject the carrier wave. Preferably, the coupling capacitor 52 will have a sufficiently large value to prevent overshoot while the trap 54 will have a low L-C ratio in order to provide minimum pulse distortion and ringing.

From the trap 54, the pulses are fed to the primary winding 56 of a transformer 58. The secondary windings 60 and 62 of the transformer 58 are polarized so that negative pulses on the primary winding 56 appear as positive pulses on secondary winding 60 while positive pulses on the primary winding appear as positive pulses on secondary winding 62. The pulses appearing on secondary windings 60 and 62 are supplied respectively to the grids of electron tubes 64 and 66. These tubes are each biased at or near cut-off so as to be insensitive to negative pulses representing pulses from the opposite channel. Thus, it will be seen that the pulses have been removed from the carrier wave and separated into independent signals corresponding to the signals emitted by detectors 8 and 10.

The pulses from tube 64, which correspond to the signal from detector 8, are passed through a differentiating circuit 68 which serves to improve the pulse shape and to reduce the effect of any of the carrier wave which may have slipped through rejection trap 54. Thereafter, the pulses are fed through amplifier 70 to a discriminator 72 which finally eliminates any trace of overshoot from the opposite channel or any remaining carrier wave signal. Finally, the signal is passed through a counting rate meter 74 to the recorder 48 where its information is plotted on curve 76.

Similarly, the pulses from tube 66, corresponding to the signal from detector 10, are passed through differentiating circuit 78 and amplifier 80 to a discriminator 82 and counting rate meter 84. Thereafter, the signal is supplied to the recorder 48 and its information is plotted as curve 86.

Figure 3:
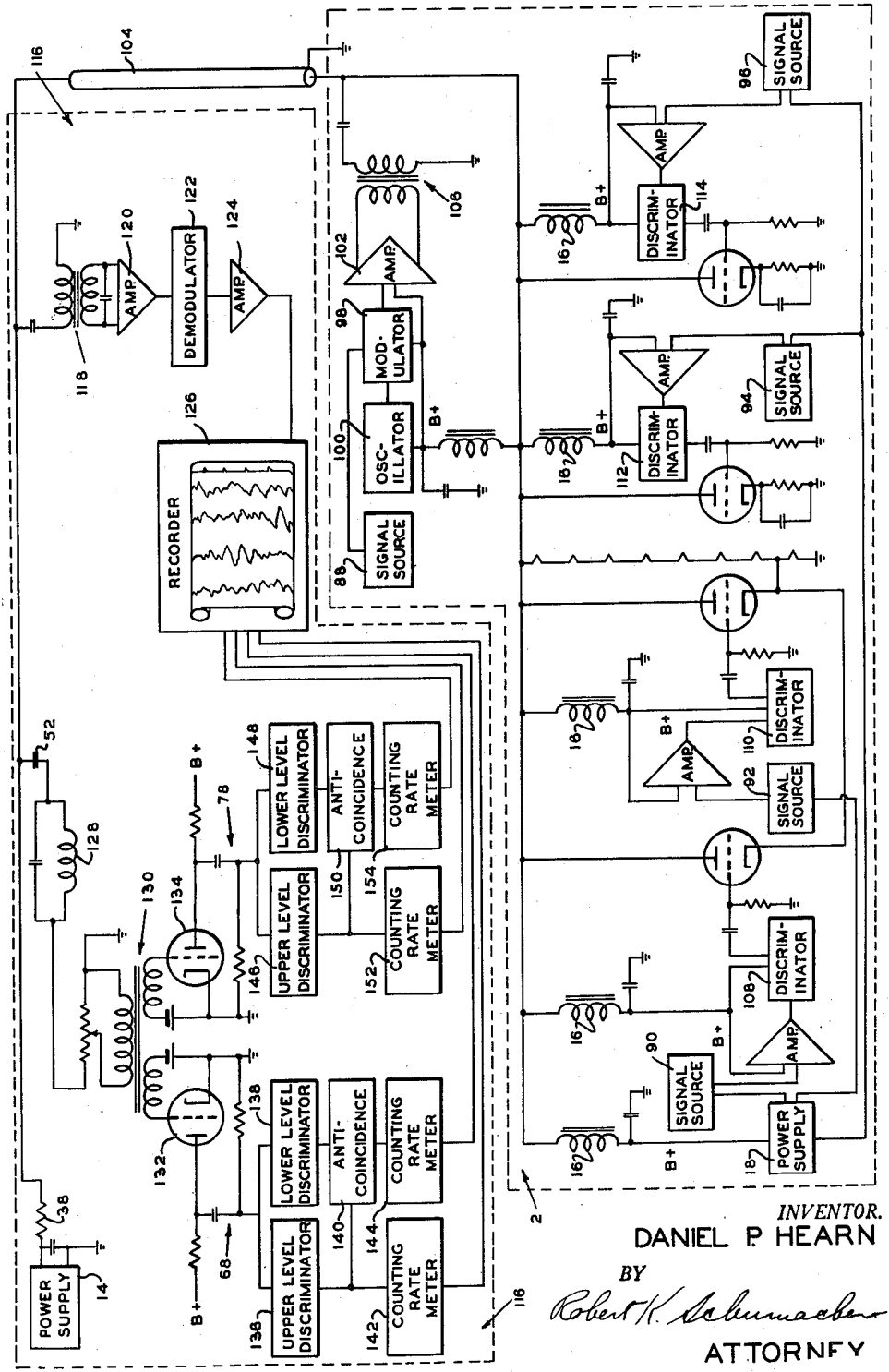
Fig. 3 is an alternative form of the invention.

While the telemetering system of the present invention has been described above in connection with radioactivity well logging, it will be obvious that the same system could be used in a wide variety of applications. For example, detectors 8, 10 and 12 could just as easily be three thermistors located in one of more furnaces and controlling signal generators while the signal separating means, referred to above as surface equipment 6, could be located in a control room or other suitable location. Thus, any type of pulse generator may be substituted for detectors 8 and 10 and any signal source whose output can be used to modulate an alternating current carrier wave can be substituted for detector 12. Consequently, virtually any three desired signals may be combined, transmitted over a single conductor and separated again into the three original signals. Obviously, the use of the signals is not limited to the operation of a recorder but, instead, the signals may serve to control equipment, set off an alarm or accomplish substantially any desired result.

Where it is necessary or desirable to transmit more than three signals over a single conductor, the circuit of Fig. 3 may be employed. This form of the invention is essentially identical to that of Fig. 1 except that positive and negative pulses of different heights are given off by the additional signal sources and are separated in the signal separating means.

To illustrate this, Fig. 3 shows five signal sources 88, 90, 92, 94 and 96. Signal source 88 corresponds to detector 12 in the description of Fig. 1 and its output is fed to modulator 98 which applies the signal to modulate a carrier wave from oscillator 100. The modulated carrier is amplified by amplifier 102 and is impressed on the conductor 104 by transformer 106. The circuits for signal sources 90 and 92 are each identical to that of detector 8 in Fig. 1 except that the pulses applied to conductor 104 from discriminator 108 have a relatively large pulse height, as indicated in line C of Fig. 4, while the pulses from discriminator 110 have a relatively small pulse height, as seen in line D of Fig. 4. It will be noted that the pulses from signal sources 90 and 92 are both negative but have different pulse heights. As in Fig. 2, the intelligence carried by the signals is found in the time rate of occurrence of the pulses.

Similarly, the circuits for signal sources 94 and 96 are each identical to that of detector 10 in Fig. 1 except t that the pulses applied to conductor 104 from discriminator 112 are positive pulses of large pulse height, as seen in line A of Fig. 4, while the pulses from discriminator 114 are positive pulses of small pulse height, shown in line B of Fig. 4. The pulses seen in line E of Fig. 4 are superimposed on the modulated carrier wave, as illustrated in line F of Fig. 4, and the combined wave is then transmitted through the conductor 104 to the signal separating means, indicated by dotted lines at 116, in the same manner as described for Fig. 1.

In the signal separating means, the carrier wave modulated by the signal from signal source 88 is removed by transformer 118, corresponding to transformer 40 of Fig. 1. The carrier is then amplified by amplifier 120 and the information from signal source 88 is removed by demodulator 122, amplified by amplifier 124 and passed to a recorder 126 or other suitable means of indication.

The pulse signals from signal sources 90, 92, 94 and 96 are removed from the carrier wave by rejection trap 128. Next, the negative pulses corresponding to the output of signal sources 90 and 92 are separated from the positive pulses of signal sources 94 and 96 by polarized transformer 130, similar to transformer 58 of Fig. 1, and vacuum tubes 132 and 134, corresponding to tubes 64 and 66 of Fig. 1. The negative pulses from signal sources 90 and 92 pass through tube 132 and are then separated according to pulse height with the high pulses from signal source 90 being accepted by a high level discriminator 136 while the low pulses from signal source 92 are rejected by discriminator 136 but are accepted by low level discriminator 138. Both discriminators are connected to feed an anticoincidence circuit 140 which prevents the high level pulses from being recorded as both high and low level pulses. Discriminator 136 also supplies the upper level counting rate meter 142 which converts the pulses of signal source 90 to a signal suitable for the recorder 126. After going through the anti-coincidence circuit 140, the low level pulses of signal source 92 are passed to the lower level counting rate meter 144 and, thence, to recorder 126.

The positive pulses of signal sources 94 and 96 appear at the grid of tube 134 and are separated according to pulse height in the same manner as described above for the negative pulses. Thus, the high level pulses of signal source 94 are passed by high level discriminator 146 whereas the low level pulses of signal source 96 are rejected by discriminator 146, but pass the low level discriminator 148. Both discriminators supply the anti-coincidence circuit 150 and discriminator 146 also feeds the high level pulses of signal source 94 to the upper level counting rate meter 152 and, thence, to the recorder 126. The low level pulses of signal source 96 are passed by the anti-coincidence circuit 150 to the low level counting rate meter 154 and then to the recorder 126.

Thus, five signals may be transmitted simultaneously over a single conductor by means of the telemetering system of the present invention. Furthermore, additional channels may be provided, if desired, by using discriminators which will pass pulses of intermediate height but reject pulses of greater or less pulse height. In this way, the number of signals which may be transmitted simultaneously over a single conductor is limited only by the selectivity of the discriminators employed. Moreover, by selecting frequencies which will not interfere with each other, several carrier waves may be transmitted over the cable at the same time. Each of these carrier waves may be modulated and pulses may be superimposed thereon in the same manner as has been described for a single carrier wave. Thus, the number of signals which may be transmitted simultaneously is virtually unlimited.

Numerous other variations and modifications may obviously be made. Accordingly, it should be clearly understood that those forms of the invention described above and shown in the figures of the accompanying drawings are illustrative only and are not intended to limit the scope of the invention.

I claim:

1. Means for transmitting a plurality of information-carrying signals over a single conductor comprising a first signal generator, an oscillator, means modulating the signal from said oscillator in accordance with the signal from said first signal generator, a conductor, impedance matching means for impressing the modulated signal on said conductor, a second signal generator, first pulse shaping means for shaping the signal from said second signal generator, an electron tube connected directly to said conductor to superimpose negative pulses on said conductor corresponding to the positive portion of the output of said first pulse shaping means, a third signal generator, second pulse shaping means for shaping the signal from said third signal generator, a second electron tube connected directly to said conductor to superimpose positive pulses on said conductor corresponding to the negative portion of the output of said second pulse shaping means, means for separating said pulses from said modulated signal at a desired location, means for demodulating said modulated signal to recover the modulating signal from said first signal generator, means for separating said pulses into separate channels, one of said channels receiving only said positive pulses, the other of said channels receiving only said negative pulses, and means for independently recording said positive pulses, said negative pulses and said modulating signal.

2. In a telemetering system comprising a signal transmitting unit, a conductor and a signal separating unit; a signal transmitting unit comprising a signal source, an oscillator, means for modulating the output of said oscillator in accordance with the signal from said source, impedance matching means for impressing the modulated signal on said conductor, a plurality of pulse generators, a separate signal circuit for each of said pulse generators, each of said signal circuits comprising means for shaping the pulses from its associated pulse generator, a separate electron tube in each of said signal circuits, each of said electron tubes having at least a cathode, a plate and a control grid, each of said electron tubes having its plate connected to said conductor and its control grid connected to receive the shaped pulses from a separate one of said pulse generators, at least one of said electron tubes being biased to draw little plate current, at least one other of said electron tubes being biased to draw heavy plate current.

3. In a telemetering system, means for simultaneously impressing a plurality of information-carrying signals on a single conductor, said means comprising a first electron tube having at least a cathode, a plate and a control grid, first signal generator means connected to apply a pulse type signal to the control grid of said first electron tube, the plate of said first electron tube being connected directly to said conductor, said first electron tube being biased to impress negative pulses on said conductor corresponding to the signal from said first signal generator means, a second electron tube having at least a cathode, a plate and a control grid, second signal generator means connected to apply a pulse type signal to the control grid of said second electron tube, the plate of said second electron tube being connected directly to said conductor, said second electron tube being biased to impress positive pulses on said conductor corresponding to the signal from said second signal generator means, third signal generator means, an oscillator, means for modulating the output of said oscillator in accordance with the signal from said third signal generator means, and impedance matching means for impressing said modulated output on said conductor.

4. A telemetering system including a subsurface instrument, a surface unit and a cable, said cable comprising an electrical conductor connecting said subsurface instrument to said surface unit, said subsurface instrument comprising a first electron tube having at least a cathode, a plate and a control grid, first signal generator means connected to apply a pulse type signal to the control grid of said first electron tube, the plate of said first electron tube being connected directly to said conductor, said first electron tube being biased to impress negative pulses on said conductor corresponding to the signal from said first signal generator means, a second electron tube having at least a cathode, a plate and a control grid, second signal generator means connected to apply a pulse type signal to the control grid of said second electron tube, the plate of said second electron tube being connected directly to said conductor to impress positive pulses on said conductor corresponding to the signal from said second signal generator means, third signal generator means, an oscillator, means for modulating the output of said oscillator in accordance with the signal from said third signal generator means, impedance matching means for impressing said modulated output on said conductor, said surface unit comprising a direct current power supply for transmitting direct current down said conductor to energize said subsurface instrument, means for separating said modulated output from said pulses, means for demodulating said modulated output to recover the modulating signal, means for utilizing said modulating signal, means for separating said positive pulses from said negative pulses, means for utilizing said positive pulses, and means for utilizing said negative pulses.

5. A telemetering system including a subsurface instrument, a surface unit and a cable, said cable comprising an electrical conductor connecting said subsurface instrument to said surface unit, said subsurface instrument comprising a first electron tube having at least a cathode, a plate and a control grid, first signal generator means connected to apply a pulse type signal to the control grid of said first electron tube, the plate of said first electron tube being connected directly to said conductor, said first electron tube being biased to impress negative pulses on said conductor corresponding to the signal from said first signal generator means, a second electron tube having at least a cathode, a plate and a control grid, second signal generator means connected to apply pulse type signals to the control grid of said second electron tube, the plate of said second electron tube being connected directly to said conductor, said second electron tube being biased to impress positive pulses on said conductor corresponding to the signal from said second signal generator means, third signal generator means, an oscillator, means for modulating the output of said oscillator in accordance with the signal from said third signal generator means, impedance matching means for impressing the modulated output on said conductor, said surface unit comprising a direct current power supply for transmitting direct current down said conductor to energize said subsurface instrument, first frequency selective means for separating said modulated output from said pulses, means for demodulating said modulated output to recover the modulating signal, means for utilizing said modulating signal, second frequency selective means for separating said pulses from the modulated output, polarized transformer means for separating said positive pulses from said negative pulses, means for utilizing said positive pulses, and means for utilizing said negative pulses.

6. A telemetering system for transmitting a plurality of signals over a single conductor and having a plurality of signal circuits and a signal separating unit connected by said conductor, said system comprising a direct current power supply located in said signal separating unit and connected to said conductor to energize said conductor, means for isolating said signal circuits from the frequency of the output of said power supply, one of said signal circuits including a first pulse generator, a first electron tube having at least a cathode, a plate and a control gird, and means connecting the output of said first pulse generator to the control grid of said first electron tube, the plate of said first electron tube being connected directly to said conductor, said first electron tube being biased to impress negative pulses on said conductor corresponding to the signal from said first pulse generator, another of said signal circuits including a second pulse generator, a second electron tube having at least a cathode, a plate and a control grid, and means connecting the output of said second pulse generator to the control grid of said second electron tube, the plate of said second electron tube being connected directly to said conductor, said second electron tube being biased to impress positive pulses on said conductor corresponding to the signal from said second pulse generator, a third one of said signal circuits including a signal generator, an oscillator, means for modulating the output of said oscillator in accordance with the signal from said signal generator, and impedance matching means for impressing the modulated output on said conductor, said signal separating unit comprising transformer means tuned to separate said modulated output from said pulses, demodulating means for separating the modulating signal from said modulated output, means for utilizing said modulating signal, a parallel resonant rejection trap tuned to reject said modulated output and to pass said pulses, polarized transformer means for separating said positive pulses from said negative pulses, means for removing extraneous signals from said positive and negative pulses, means for utilizing said positive pulses, and means for utilizing said negative pulses.

7. A telemetering system for use in radioactivity well logging having a subsurface instrument and surface equipment connected by a cable, said system comprising a conductor in said cable, a subsurface instrument including a gamma ray detector, a first electron tube having at least a cathode, a plate and a control grid, means supplying the output from said gamma ray detector to the control grid of said first electron tube, the plate of said first electron tube being connected directly to said conductor, said first electron tube being biased to impress negative pulses on said conductor corresponding to the output of said gamma ray detector, a neutron detector, a second electron tube having at least a cathode, a plate and a control grid, means supplying the output of said neutron detector to the control grid of said second electron tube, tube plate of said second electron tube being connected directly to said conductor, said second electron tube being biased to impress positive pulses on said conductor corresponding to the output of said neutron detector, a casing collar detector, an oscillator, means for modulating the output of said oscillator in accordance with the signal from said casing collar detector, impedance matching means for impressing the modulated output on said conductor, and surface equipment including a direct current power supply connected to transmit direct current down said cable to energize said subsurface instrument, a transformer tuned to separate said modulated output from said pulses, demodulator means for removing the casing collar detector signal from said oscillator output, a multiple trace recorder, means for causing said recorder to draw a first curve corresponding to said casing collar detector signal, a parallel resonant rejection trap tuned to reject said modulated output and to pass said positive and negative pulses, a polarized transformer for separating said positive pulses from said negative pulses, means for causing said recorder to draw a second curve corresponding to said positive pulses and thereby representing the neutron flux adjacent said subsurface instrument, and means for causing said recorder to draw a third curve corresponding to said negative pulses and thereby representing the gamma ray flux adjacent said subsurface instrument.

References Cited in the file of this patent

UNITED STATES PATENTS

| | | |
|---|---|---|
| 2,368,532 | Fearon | Jan. 30, 1945 |
| 2,412,575 | Frosch | Dec. 17, 1946 |
| 2,686,268 | Martin et al. | Aug. 10, 1954 |
| 2,740,053 | Scherbatskoy | Mar. 27, 1956 |
| 2,824,238 | Stellmacher | Feb. 18, 1958 |

UNITED STATES PATENT OFFICE
CERTIFICATE OF CORRECTION

Patent No. 2,942,112　　　　　　　　　　　　June 21, 1960

Daniel P. Hearn

It is hereby certified that error appears in the printed specification of the above numbered patent requiring correction and that the said Letters Patent should read as corrected below.

Column 2, line 27, for "vairous" read -- various --; column 5, line 68, for "except t" read -- except --; column 8, line 25, for "leaving" read -- having --; line 66, for "gird" read -- grid --.

Signed and sealed this 13th day of December 1960.

(SEAL)
Attest:

KARL H. AXLINE
Attesting Officer

ROBERT C. WATSON
Commissioner of Patents